(12) United States Patent
Ahuja et al.

(10) Patent No.: US 10,320,830 B2
(45) Date of Patent: Jun. 11, 2019

(54) AUTOMATED ASSET CRITICALITY ASSESSMENT

(71) Applicant: McAfee, LLC, Santa Clara, CA (US)

(72) Inventors: Ratinder Paul Singh Ahuja, Saratoga, CA (US); Sven Schrecker, San Marcos, CA (US)

(73) Assignee: McAfee, LLC, Santa Clara, CA (US)

( * ) Notice: Subject to any disclaimer, the term of this patent is extended or adjusted under 35 U.S.C. 154(b) by 0 days.

(21) Appl. No.: 15/959,946

(22) Filed: Apr. 23, 2018

(65) Prior Publication Data

US 2018/0351988 A1 Dec. 6, 2018

Related U.S. Application Data

(63) Continuation of application No. 13/718,970, filed on Dec. 18, 2012, now Pat. No. 9,954,883.

(51) Int. Cl.
*H04L 29/06* (2006.01)
*G06F 21/57* (2013.01)
*G06F 21/56* (2013.01)

(52) U.S. Cl.
CPC ........ *H04L 63/1433* (2013.01); *G06F 21/568* (2013.01); *G06F 21/577* (2013.01); *H04L 63/1408* (2013.01); *H04L 63/1416* (2013.01); *G06F 2221/2111* (2013.01)

(58) Field of Classification Search
CPC ........... G06F 21/577; G06F 2221/2111; G06F 21/568; H04L 63/1433; H04L 63/1408; H04L 63/1416
See application file for complete search history.

(56) References Cited

U.S. PATENT DOCUMENTS

| 5,987,610 | A | 11/1999 | Franczek et al. |
| 6,073,142 | A | 6/2000 | Geiger et al. |
| 6,460,050 | B1 | 10/2002 | Pace et al. |
| 7,506,155 | B1 | 3/2009 | Stewart et al. |
| 2002/0138416 | A1 | 9/2002 | Lovejoy et al. |

(Continued)

FOREIGN PATENT DOCUMENTS

| KR | 1020060058186 | 5/2006 |
| KR | 1020120076661 A | 7/2012 |

(Continued)

OTHER PUBLICATIONS

"McAfee Risk Advisor 2.7 Software for use with ePolicy Orchestrator 4.5.0 and 4.6.0 Software Product Guide," Mar. 21, 2012, retrieved from the Internet: URL:_https://kb.mcafee.com/resources/sites/MCAf=EE/content/!ive/PRODUCT...DOCUJVIE_NTA-TION/2 3000/PD,:368.5Lf:N ushiRA 2.7.0 Product Guide en-us,pdf, 153 pages.

(Continued)

*Primary Examiner* — Theodore C Parsons
(74) *Attorney, Agent, or Firm* — Patent Capital Group

(57) ABSTRACT

A set of attributes of a particular asset of a computing environment is identified that are determined from data collected by one or more utilities in the computing environment. A criticality rating is automatically determined for the particular asset based at least in part on the set of attributes. A security activity is caused to be performed relating to the particular asset based on the automatically determined criticality rating of the particular asset.

20 Claims, 6 Drawing Sheets

(56) References Cited

U.S. PATENT DOCUMENTS

| | | |
|---|---|---|
| 2006/0010493 A1 | 1/2006 | Piesco et al. |
| 2006/0136327 A1 | 6/2006 | You |
| 2006/0191012 A1 | 8/2006 | Banzhof et al. |
| 2007/0192867 A1 | 8/2007 | Miliefsky |
| 2008/0184131 A1 | 7/2008 | Stack et al. |
| 2008/0189788 A1* | 8/2008 | Bahl .................. G06F 21/577 726/25 |
| 2009/0089869 A1* | 4/2009 | Varghese ............... G06F 21/31 726/7 |
| 2010/0305990 A1* | 12/2010 | Tyree ................... G06Q 10/06 705/7.36 |
| 2012/0047575 A1 | 2/2012 | Baikalov et al. |
| 2012/0180133 A1 | 7/2012 | Al-Harbi et al. |
| 2012/0185945 A1 | 7/2012 | Andres et al. |
| 2013/0031634 A1 | 1/2013 | McClure et al. |
| 2013/0074188 A1 | 3/2013 | Giakouminakis et al. |
| 2013/0104236 A1 | 4/2013 | Ray et al. |
| 2013/0191919 A1 | 7/2013 | Basavapatna et al. |
| 2014/0075564 A1 | 3/2014 | Singla et al. |
| 2014/0137257 A1 | 5/2014 | Martinez et al. |
| 2014/0173739 A1 | 6/2014 | Ahuja et al. |
| 2015/0143528 A1 | 5/2015 | Johansson et al. |

FOREIGN PATENT DOCUMENTS

| | | |
|---|---|---|
| KR | 1020120134725 | 12/2012 |
| WO | 2012166194 A1 | 12/2012 |
| WO | 2013109374 A1 | 7/2013 |
| WO | 2014100103 A1 | 6/2014 |

OTHER PUBLICATIONS

International Preliminary Report on Patentability in International Application No. PCT/US2013/075980, dated Jul. 2, 2015, 8 pages.

International Search Report and Written Opinion in International Application No. PCT/US2013/075980, dated Apr. 1, 2014, 9 pages.

Jvalverd: "Release Announcement: McAfee Risk Advisor 2.7.1," Aug. 10, 2012, McAfee Communities, retrieved from the Internet: URL: https://community.mcafee.com/thread/47568, 1 page.

Notice of Preliminary Rejection in KR Application No. 2015-7012730, dated Mar. 14, 2016, English translation, 10 pages.

Supplementary European Search Report in EP Application No. 13 86 5956, dated Jun. 15, 2016, 8 pages.

Office Action in CN Application No. 2013800501774, dated Dec. 5, 2016, with English translation, 27 pages.

Office Action in CN Application No. 2013800501774, dated Jan. 12, 2018, with English translation, 22 pages.

Office Action in CN Application No. 2013800601774, dated Jul. 11, 2017, with English translation, 23 pages.

Office Action in EP Application No. 13 865 956.0, dated Dec. 1, 2017; 4 pages.

Reginald E. Sawilla, Xinming Ou, "Identifying critical attack assets in dependency attack graphs," Proceeding of 13th European Symposium on Research in Computer Security, Malaga, Spain (Oct. 6-8, 2008), 47 pages.

* cited by examiner

AUTOMATED ASSET CRITICALITY ASSESSMENT

CROSS-REFERENCE TO RELATED APPLICATION

This Application is a continuation (and claims the benefit of priority under 35 U.S.C. § 120) of U.S. application Ser. No. 13/718,970, filed Dec. 18, 2012, entitled "AUTOMATED ASSET CRITICALITY ASSESSMENT," Inventors, Ratinder Paul Singh Ahuja, et al., issued as U.S. Pat. No. 9,954,883 on Apr. 24, 2018. The disclosure of the prior application is considered part of (and are incorporated in its entirety by reference in) the disclosure of this application.

TECHNICAL FIELD

This disclosure relates in general to the field of computer security and, more particularly, to computer system risk assessment.

BACKGROUND

The Internet has enabled interconnection of different computer networks all over the world. The ability to effectively protect and maintain stable computers and systems, however, presents a significant obstacle for component manufacturers, system designers, and network operators. Indeed, each day thousands of new threats, vulnerabilities, and malware are identified that have the potential of damaging and compromising the security of computer systems throughout the world. Maintaining security for large computing systems including multiple devices, components, programs, and networks can be daunting given the wide and evolving variety of vulnerabilities and threats facing the various components of the system. While security tools, safeguards, and other countermeasures may be available to counteract system threats and vulnerabilities, in some cases, administrators may be forced to triage their systems to determine how best to apply their financial, technical, and human resources to addressing such vulnerabilities. Risk assessment tools have been developed that permit users to survey risk associated with various devices and components in a system. A risk assessment of a system can identify and quantify the risk exposed to any one of a variety of system components as well as the overall risk exposed to the system as a whole.

BRIEF DESCRIPTION OF THE DRAWINGS

Like reference numbers and designations in the various drawings indicate like elements.

DETAILED DESCRIPTION OF EXAMPLE EMBODIMENTS

Figure 1:
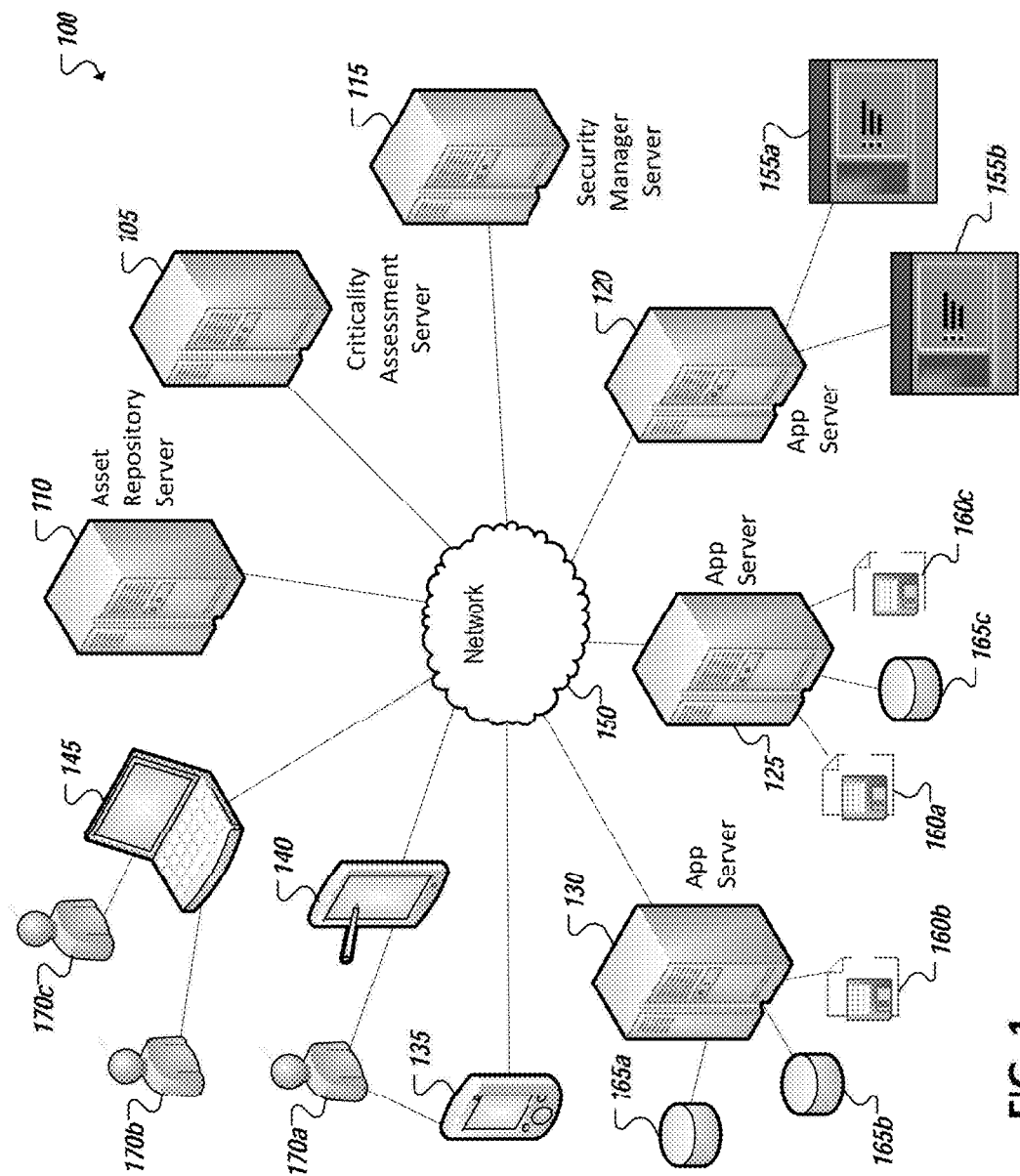
FIG. 1 is a simplified schematic diagram of an example system including a criticality assessment server in accordance with one embodiment.

FIG. 1 is a simplified block diagram illustrating an example embodiment of a computing environment 100 including an example criticality assessment server 105, asset repository server 110, and security manager server 115, among potentially other tools, servers, and devices, including combinations thereof. For example, the environment 100 can further include application servers (e.g., 120), data servers (e.g., 125, 130), and end user devices (e.g., 135, 140, 145). Assets of the environment can include devices, applications, data structures, network elements (e.g., of network 150), etc. of the system. Further, assets of the computing environment 100 can host or otherwise be associated with other assets of the environment 100. For instance, server assets (e.g., 105, 110, 115, 120, 125, 130, etc.) can host applications and services (e.g., 155*a*, 155*b*), databases and other data stores (e.g., 165*a*-165*c*), files and other data structures (e.g., 160*a*-160*c*), among other resources. In some instances, persons affiliated with the computing environment 100, such as users (e.g., 170*a*-170*c*) of other assets of the computing environment can, themselves, be considered assets of the computing environment.

In some implementations, a criticality assessment server 105 can host tools used to automatically determine criticality of the various assets of the computing environment. For instance, data collected describing attributes of the assets can be accessed and compared against criticality criteria, conditions, and rules (sometimes referred to herein collectively as "rules") to determine criticality ratings, scores, and scores of the assets. In some instances, criticality assessments can process asset data collected at the criticality assessment server 105 and/or included in other data stores of the environment. For instance, in some implementations an example asset repository server 110 can host and manage a repository of asset records, the asset records including data and information collected (e.g., using security tools and other utilities collecting data relating to the environment 100 and deployed on the assets themselves, the network, or otherwise within (or outside) the computing environment 100). Further, the deployed security tools can be managed by an example security management server 115, managing both the monitoring and collection of data relating to assets of the computing environment 100, but also, in some implementations, processing security-related data to perform operations assessing and managing security of the computing environment and its respective assets. For instance, an example security management server 115 can manage and control the scanning and analysis of devices, applications, network elements, storage elements, other components and resources, and users (collectively "assets") in the environment 100 to assess computing risk associated with individual assets, as well as the composite or aggregate risk in subsystems including two or more of the computing environment's assets, as well as the risk in the computing environment 100 as a whole.

Assets of the environment 100 can be categorized by type. For instance, servers (e.g., 105, 110, 115, 120, 125, 130, etc.) and end user devices (e.g., 135, 140, 145) can be considered system-type assets. Servers (e.g., 105, 110, 115, 120, 125, 130, etc.) can include computing devices providing backend and/or mainframe support for the environment, as well as serving applications, shared resources, programs, and other services and resources to remote clients, for instance, over the Internet. Applications, data stores, programs, software services, security tools, data files, and other resources of the computing environment can be considered application-type or content-type assets and can be used or consumed within the system, for instance, by other software or hardware-based assets of the computing environment, including servers (e.g., 105, 110, 115, 120, 125, 130, etc.) and end user devices (e.g., 135, 140, 145). End user devices 110, 115, 120, 125, 130 can include computing devices operable to communicate with other devices in the environment 100, for instance, over one or more networks 150, in connection with system users consuming, developing, testing, or otherwise interacting with programs, applications, services, and other functionality of the environment 100, or remote hosts or data sources outside of environment 100. Users (e.g., 170a-c) can be considered person-type assets.

In general, "servers," "devices," "computing devices," "end user devices," "clients," "endpoints," "computers," and "system assets" (e.g., 105, 110, 115, 120, 125, 130, 135, 140, 145, etc.) can include electronic computing devices operable to receive, transmit, process, store, or manage data and information associated with the software system 100. As used in this document, the term "computer," "computing device," "processor," or "processing device" is intended to encompass any suitable processing device adapted to perform computing tasks consistent with the execution of computer-readable instructions. Further, any, all, or some of the computing devices may be adapted to execute any operating system, including Linux, UNIX, Windows Server, etc., as well as virtual machines adapted to virtualize execution of a particular operating system, including customized and proprietary operating systems.

System assets can include end user devices (e.g., 135, 140, 145) in environment 100. End user devices can include devices implemented as one or more local and/or remote client or endpoint devices, such as personal computers, laptops, smartphones, tablet computers, personal digital assistants, media clients, web-enabled televisions, telepresence systems, and other devices adapted to receive, view, compose, send, or otherwise interact with, access, manipulate, consume, or otherwise use applications, programs, and services served or provided through servers within or outside the environment 100. A client or end user device can include any computing device operable to connect or communicate at least with servers, other client or end user devices, networks, and/or other devices using a wireline or wireless connection. Each end user device can include at least one graphical display device and user interfaces, allowing a user to view and interact with graphical user interfaces of applications, tools, services, and other software of environment 100. It will be understood that there may be any number of end user devices associated with environment 100, as well as any number of end user devices external to environment 100. Further, the term "client," "end user device," "endpoint device," and "user" may be used interchangeably as appropriate without departing from the scope of this disclosure. Moreover, while each end user device may be described in terms of being used by one user, this disclosure contemplates that many users may use one computer or that one user may use multiple computers.

While FIG. 1 is described as containing or being associated with a plurality of elements, not all elements illustrated within system 100 of FIG. 1 may be utilized in each alternative implementation of the present disclosure. Additionally, one or more of the elements described herein may be located external to system 100, while in other instances, certain elements may be included within or as a portion of one or more of the other described elements, as well as other elements not described in the illustrated implementation. Further, certain elements illustrated in FIG. 1 may be combined with other components, as well as used for alternative or additional purposes in addition to those purposes described herein.

Asset criticality can be a factor in the management of security in a computing environment. Criticality can represent an impact of one or more of the computing environment's assets being lost or damaged. In some implementations, the criticality of an asset can be derived from a monetary value of an asset, such as an estimate of the monetary cost of replacing or repairing the asset. Alternatively or additionally, the criticality of an asset can be derived from a business value of the asset, such as an importance of the asset to the overall asset system, revenue stream, etc. The criticality can also be based on the sensitivity and/or dependency of other system components and assets to the particular asset and the potential effects of the being lost or damaged, or the aggregate damage caused by the loss or damage of an asset to other portions of the environment. Ratings, scores, and other measures can be developed for the criticality of an asset.

A measure of an asset's criticality can be considered in connection with risk assessments of the asset and the environment as a whole. Risk assessment can include the assessment of the quantitative or qualitative value of risk related to a particular set of conditions or event affecting a particular asset. The risk can be founded in recognized or predicted threats facing the asset(s) and the potential arm that would be caused by the threat. Risk assessments can focus on the particular threats or vulnerabilities to the threats, as well as the technical configurations and attributes of a system that relate to these threats and vulnerabilities.

A threat can broadly refer to something that causes, attempts to cause, or potentially could cause a negative impact to an objective or an asset. For example, a threat may include malware that could disrupt business operations, a natural disaster, an organization that is targeting a person, industry, etc., or even a partner or vendor that has been compromised. A vulnerability can generally include any weakness or condition of an asset that can be affected by or exploited by a threat. A vulnerability may include, for example, misconfigured software or hardware; an employee susceptible to manipulation, temptation, or persuasion threatening an asset; inadequate security measures, password protections, etc., among many other potential examples. Further, while risk can be enhanced by the presence of threats and vulnerabilities affecting an asset, countermeasures can reduce or mitigate risk. A countermeasure can include anything that can mitigate a vulnerability or threat, such as antivirus software, intrusion protection systems, a software patch, a background check, hardware upgrades, network security tools, password strength, encryption schemes, among many other examples both deployed locally at the device or on other, remote devices, such as network elements, security tools, etc. monitoring, used with, or in communication with the asset.

Quantitative risk assessment, in some instances, can include the evaluation of both the magnitude of the potential impact (e.g., loss or harm) to an asset (e.g., as expressed through a criticality score or severity score for a threat, etc.), and the probability that an event will cause the impact. The combination of these components can be used to create a risk metric that is both forward-looking and has predictive capabilities. The ability to predict allows for identification of risk metrics relating to various, specific assets within a computing environment, groupings of assets, or the operating environment as a whole, as well as allowing for prioritization of tasks to reduce risk, in connection with risk management of the computing environment.

Managing risk can include identifying, characterizing, and assessing threats; assessing vulnerability of assets to specific threats; determining the risk to specific assets based on specific vulnerabilities and threats and criticality of affected assets; and implementing strategies for reducing or eliminating the risk, including the identification of countermeasures that wholly or partially eliminate a threat or vulnerability responsible for a particular risk. In addition to being a component in risk assessments of one or more assets of a computing environment, asset criticality can also play a role in the other elements of risk management. As an example, responses to various vulnerabilities and threats, such as the deployment or development of countermeasures targeting these vulnerabilities or threats, can be prioritized to address those vulnerabilities and threats affecting those assets with the highest criticality. For instance, deployment of countermeasures on assets can be prioritized based on each asset's respective criticality, with more critical assets receiving attention before other assets with lower criticality measures, among other examples.

In traditional risk management systems, criticality can be based on user-specified asset criticality attributes. For instance, users can specify the criticality of individual assets, or groups of assets, for example, through a user interface. For example, a set of one or more assets can be selected and defined by the user as having a particular level of criticality based on the asset's position within a hierarchy, IP address, type of asset, etc. A criticality score mapped to the specified criticality level can then be defined for the asset(s). Users can assist in more detailed criticality assessments as well. For instance, administrators can be tasked with providing detailed attribute information about one or more assets and the user-provided information can serve as the basis for a criticality score for the assets.

In traditional criticality assessments, the expertise and knowledge of various administrator users and asset owners has been relied on heavily to ascertain the importance, value, etc. of a given asset, as well as the attributes of the asset. In instances where risk assessments or countermeasure deployments are based at least in part on an asset's criticality rating, engaging and waiting for administrators and asset owners to respond and provide inputs to generate refresh, or modify an asset's criticality assessment can delay the risk assessment. In some instances, such delays may result in incorrect or estimated criticality ratings being used for some assets. Further, having disparate users in an environment responsible for different assets and groups of assets can result in uneven and subjective criticality assessments across a system. Risk assessments and other tasks reliant on the criticality assessments can be similarly inconsistent as a result. Additionally, in some instances, burdening already busy administrators and system users can be inefficient and result in sub-optimal criticality assessments subject to incomplete analyses and human error, among other examples issues.

Figure 2:
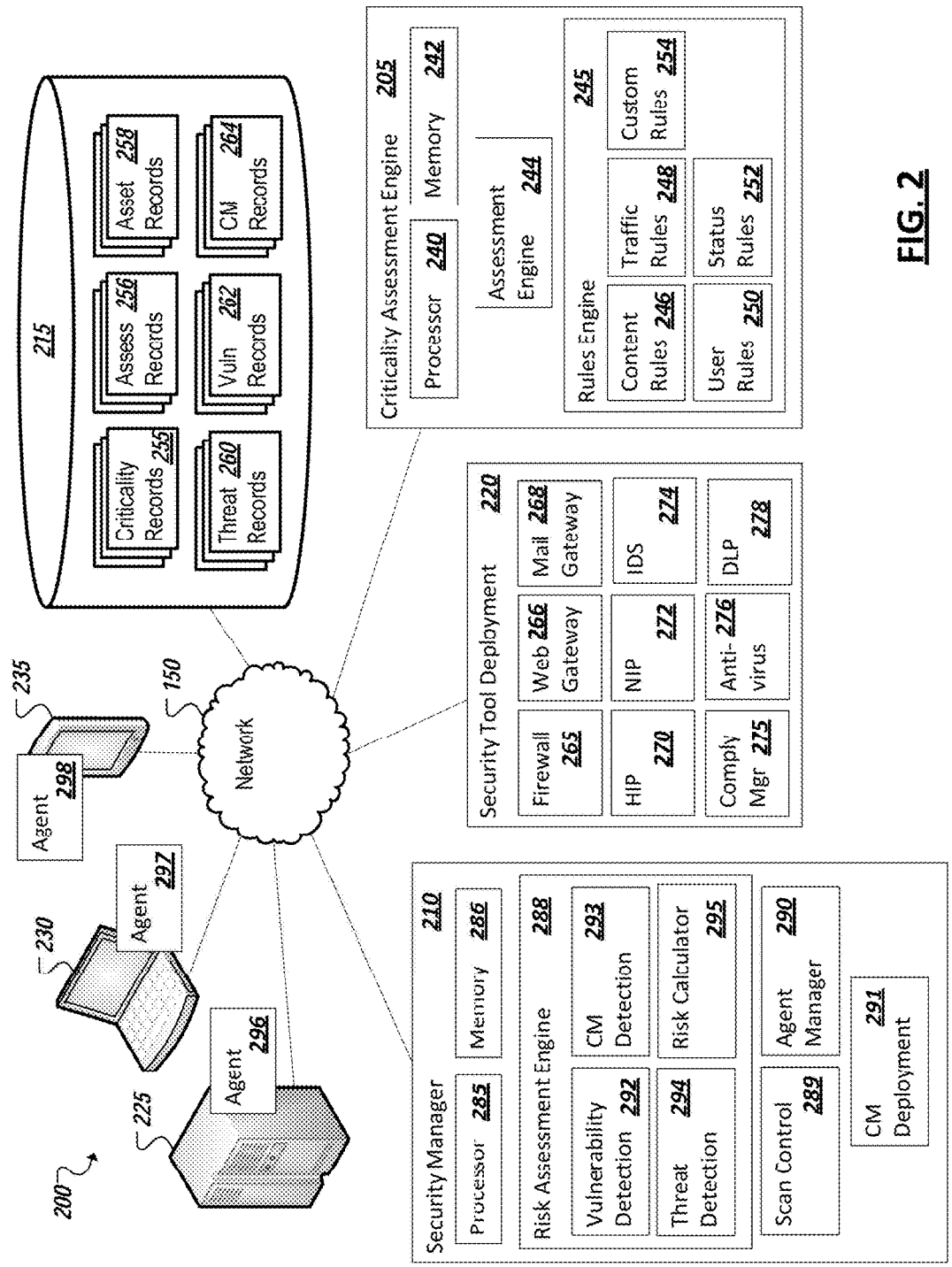
FIG. 2 is a simplified block diagram of an example system including an example criticality assessment engine in accordance with one embodiment.

In some instances, data collected for the assets can be assessed without the involvement of a human user, allowing for uniform, substantially real time criticality assessments based on objective data collected, in some cases automatically, for the various assets in an environment, among other example advantages. For example, systems and tools can be provided, similar to those described in the present Specification, that provide these and other benefits and resolve many of the above-described issues in traditional criticality assessments. For instance, as shown in the example of FIG. 2, a simplified block diagram 200 illustrates a system or computing environment including, for instance, a criticality assessment engine 205, security manager 210, asset repository 215, and a deployment of security tools 220 in connection with one or more assets (e.g., 225, 230, 235) in the computing environment.

An example criticality assessment engine 205 can include one or more processors (e.g., 240), memory elements (e.g., 242), and software and/or hardware-implemented components including, for example, an assessment engine 244 and rules engine 245, among potentially other components, functionality, etc. An assessment engine 244 can provide functionality for determining criticality ratings, scores, and other measures of particular assets' (e.g., 225, 230, 235) criticality. Criticality ratings or scores can indicate the impact of the loss or damage to an asset and can, in some instances, be based on one or more assessment rules (e.g., 246, 248, 250, 252, 254) managed by a rules engine 245. Further, in some implementations, an assessment engine 244 can make use of a library of criticality assessment checks, each check adapted to check whether an asset possesses a respective characteristic evidencing higher (or lower) criticality, as defined, for instance, by a corresponding rule. Criticality ratings generated by a criticality assessment engine 205 can also be incorporated in records, such as criticality records 255, describing determined criticality ratings of the assets (e.g., 225, 230, 235) within the computing environment.

In some implementations, an example assessment engine 244 can access data describing various attributes of a particular asset, such as security tools deployed on behalf of the particular assets, network traffic patterns involving or referencing the asset, change control, access control, and data loss protections in place in connection with the asset, change control the user(s) of the asset, global positioning information relating the location of the asset, the status of the asset within an environment, the applications, operating system, peripherals installed on or in use with the asset, among many other examples. Such information can be collected, for instance, by security tools (e.g., 265-284) deployed locally or remote from the asset, as well as locally deployed agents (e.g., 296, 297, 298), among other examples. Further, in some implementations, attribute data collected by security tools (e.g., 265-284), agents (e.g., 296, 297, 298), and other entities inside and outside the computing environment can be collected and maintained at one or more data repositories, such as asset repository 215.

In one example, an asset repository 215 can maintain records (e.g., 256) describing scans, assessments, and other tasks performed on various assets (e.g., 225, 230, 235) within an environment, attribute records of the assets (e.g., 258), and other data for use, for instance, in connection with security management of the computing environment and its constituent assets. For instance, asset repository can maintain records describing threats (e.g., 260), vulnerabilities (e.g., 262), and countermeasures (e.g., 264) affecting a system, as well as criticality records (e.g., 255), for use, for example, in generating risk scores and performing other risk assessments of the assets (e.g., 225, 230, 235) and the system.

From data collected from various software- and hardware-implemented tools and devices deployed within (and in some cases, outside) the computing environment, assessment engine 244 can identify attributes of particular assets (e.g., 225, 230, 235), and compare the attributes to criteria and rules (e.g., 246, 248, 250, 252, 254) to determine what attributes of the asset contribute to or decrease its criticality and to what degree. The assessment engine 244 can further utilize these comparisons and assessments to derive a criticality rating or score for the particular asset.

Rules and criteria (e.g., 246, 248, 250, 252, 254) used by the assessment engine 244 in the generation of criticality ratings and scores for the assets of a computing environment can pertain to various categories of indicators, uses, and attributes of an asset that evidence criticality of the asset or a lack thereof. For example, rules can include content rules 246, traffic rules 248, user rules 250, and status rules 252, among other examples. Indeed, in some implementations, custom rules (e.g., 254) can also be defined by users, administrators, etc. to supplement other rules (e.g., 246, 248, 250, 252), that, too, can be processed by an assessment engine 244 in connection with related attribute data of a particular asset. Users can further define parameters and values of rules (e.g., 246, 248, 250, 252, 254) to weight or indicate the relevance or importance of various rules, to thereby customize how (or even if) certain rules (e.g., 246, 248, 250, 252, 254) are considered by the assessment engine to contribute to criticality ratings generated from criticality assessments of assets of a particular computing environment.

In one example, content rules (e.g., 246) can be defined pertaining to content protections that involve the asset. In instances where an asset includes or embodies content itself, such as file assets, database assets, etc., content rules 246 can involve the characterization of the assets into various categories as well as the identification of protections that are in place for the assets. For instance, characteristics of data structures and content, such as its type (e.g., database), size, role or purpose within the computing environment, identity of users or groups of users responsible for or authorized in managing, administering, developing or creating the data, where and how the data is served or stored, etc., can be defined as indicators of the data's criticality. For instance, data created by or owned by a non-administrator, non-management user, etc. can be regarded as being generally less critical than similar data created or managed by a system administrator, upper-level manager, etc. Additionally, data of a larger file size or with a larger number of tables, records, etc. can be regarded as having a generally higher criticality than similar data of a smaller size (e.g., data that is arguably easier or less costly to replace, etc.). As another example, content rules 246 can define particular servers, directories, storage locations, or types thereof as indicators of the data's criticality, for instance, based on certain servers, directories, storage locations being identified as reserved for or generally serving as repositories for critical data.

In another example, content rules can pertain to how, how often, when, and under what conditions, etc. particular data is accessed, executed, or otherwise used by other assets, with rules being defined that correlate types and patterns of asset usage with high criticality. Further, the type of content of the asset can also be defined as pertaining to its criticality, such as assets identified as including sensitive or important user data, such as credit card information of customers, password information, trade secret records, and other sensitive and private data, among other examples. Regardless of what attributes are defined as contributing to understanding of the assets' respective criticalities, such asset attributes can be automatically identified, for instance, from scans of the assets or data collected from one or more utilities and tools within a computing environment. The collected data can indicate, for example, file size, owner, file location, usage, content type, etc. of the asset and these attributes and data can be compared or processed against content rules to identify or determine how and whether those attributes indicate that the asset is more or less critical to a system.

Content rules 246 can identify that the protection and types of protection employed at an assets correlates to the asset's criticality. For instance, security tools and protections can also be identified as pertaining to particular content, files, programs, and other data. The presence of protections or deployed security measures and the types of protections employed can all be defined as indicators of the content's value and importance within an environment. For instance, content protections such as data loss prevention schemes and tools protecting the asset, password protection, encryption, scheduled security scans, etc. of the asset, can be detected. Data can be collected, for instance, from tools (e.g., 220) implementing the protections to identify that the protections apply to a given asset.

In addition, content rules 246 can be applied to assist in determining criticality of device assets (e.g., 225, 230, 235), or system-type assets, that manage, store, access, or otherwise use content. For example, system assets identified as having or permitting access to, making frequent use of, or editing particular content of an asset, etc. can be used to determine that a particular asset is more critical. For instance, system assets that store or maintain, create, or otherwise use content identified as having high criticality can themselves be identified has having high criticality. Indeed, criticality of different assets can be interdependent, with the use of high criticality content by system assets or applications evidencing criticality of the system or application. The reverse can also be true and embodied in assessment rules (and checks), with particular content being identified as more critical through its use by, storage at, creation by, or association with system and/or application assets determined to have high criticality, etc. Further, content-based security policies, schemes, and tools and deployment or association of the protections with various system- and/or application-type assets can be defined by content rules 246 as evidence of a system- and/or application-type asset's criticality. For example, data loss protection, content management tools, etc. can identify the extent to which an system- and/or application-type asset is permitted or authorized to access a particular content-type asset, as well as what type of access and activities permitted for the system- and/or application-type asset. Such information can be used to identify, based on content rules 246, the importance or value of the system- and/or application-type asset within the computing environment, among other examples.

In addition to content rules 246, traffic rules 248 can be included and defined that describe additional conditions, attributes, and circumstances evidencing criticality of various assets and asset types. Traffic rules 248 can relate to communications between assets, over networks (e.g., 150) of a computing environment, as well as communications involving assets of a computing environment with other entities outside the computing environment. Data can be collected, for instance, by security tools (e.g., 220) and network elements of networks (e.g., 150) indicating the amount, type, recipient/sender of communications traffic involving assets in the computing environment, including system-type, application-type, and content-type assets. Information and attributes can be extracted for the various assets of the computing environment from this data and used in the automated determination of criticality for the assets. For instance, originating or received traffic relating to assets can be monitored and otherwise processed to collect information including types of data and information included in the traffic (e.g., sensitive, proprietary and other private information, etc.), the size of files transmitted in the traffic, operating systems of the devices included in the communication, the identities of the respective devices sending and receiving the communication, the types of protocols and protections (e.g., encryption) applied to the traffic, geographic locations of the sent/received traffic, among other information and attributes.

In some implementations, traffic rules 248 can be used to determine that a given asset is more or less critical to a computing environment, organization, etc., based for instance on the amount of traffic originating from, passing through, or received at the asset. For instance, a traffic rule 248 can define various traffic thresholds, such as average traffic, indicating that an asset has a higher criticality. Such traffic thresholds can pertain to the overall amount of traffic received or sent, the amount of traffic in particular time windows of interest, amounts of traffic relating to certain system functions or types of data transmissions (e.g., time-clustering), etc. In some implementations, identification of traffic volume characteristics of a particular asset, whether it be a particular system asset, application asset, or even content asset (such as a particular file, database, or other data structures being queried or utilized in a transaction included in the traffic), can be used to identify one or more roles of the asset within the computing environment with respect to communications and functionality within the computing environment. In addition, the quantity of different connections between the asset and another entity can also be considered in determining a role of the respective asset. Roles that can be determined for an asset can include, as examples, a front-end server, database server, critical enterprise system, etc. or other system considered important and of particular value to an organization, etc.

Dependence of other assets, services, customers, and other entities can also be determined based on traffic data involving the asset. For instance, multiple connections to an asset can indicate that many other entities depend on the operation, functionality and/or data of a particular asset evidencing criticality of the asset. Alternatively, multiple connections from an asset to other assets can additionally indicate criticality of the asset. Assets upon which large numbers of other assets are dependent can have a higher criticality. Further, other assets with high criticalities that are dependent on a particular asset can further enhance consideration of the particular asset as a high criticality asset. For instance, a relatively large amount of communications by a first asset with a second asset having a high criticality rating can indicate criticality of the first asset as well, in some examples.

In some implementations, additional rules, such as user rules 250 can defined and used in automated criticality assessments of assets. User rules 250 can map associations between an asset and certain important users, such as administrators, security managers, executives, attorneys, and other users, user types, roles, permission levels, security clearances, etc. to increase the criticality rating of asset. In other words, user rules 250 can dictate that an asset owned, created, or managed by, or frequently interacted with or used by one or more of a group of select users can result in increases to the asset's criticality rating. As examples, an asset identified as being resident on a machine of a corporate executive, a database used by several company attorneys, a file created by a system administrator, etc. can evidence criticality of the machine, database, and file, respectively, based on their corresponding association with users, defined in the user rules 250, as evidencing higher criticality of the assets, among other example.

In some examples, user rules 250 can be contextual, in that criticality of a user (and the user's machine, files, business processes, etc.), increases based on the context of the user's use of a network. For instance, criticality of a particular user's computing device can be assessed higher when it is determined that the particular user in engaged in transactions, connected to networks, accessing system resources, etc. pertaining to a particular use or business process with which the particular user is associated. For example, the laptop of a chief financial officer of an ecommerce company may be assessed with a higher criticality as it regards use of the machine in connection with the company's financial management. The CFO user, at other times, may access other systems of the ecommerce company, even as a customer, that are more tangentially related to the CFO's role within the ecommerce company, at which the CFO's laptop is less critical. In some instances, users can be regarded as assets and the criticality of that particular user (e.g., CFO, CEO, general counsel) may be confined to certain contexts (e.g., the CFO is more critical as it relates to a process for generating a quarterly report than in the development of a marketing campaign for the same company, etc.). Criticality of users may be reflected in automated criticality assessments of computing devices, content (e.g., content managed, accesses, or created by the user), etc. associated with the user (and their respective roles and responsibilities contributing to their criticality to the organization), among potentially many other examples.

In some instances, context can be considered in other automated criticality assessments. For example, temporal considerations can influence criticality of an asset from one instance to another. In an example, a business process for generating, for example, a financial report (or other deliverable subject to a calendar deadline), can influence criticality assessed for one or more assets used or otherwise associated with this business process. For instance, as a deadline for a deliverable approaches, criticality can increase, suggesting the increased costs or severity of losing a particular server, database, file, user device, etc. close to the deadline and thereby jeopardizing an organization's (or user's) ability to meet the deadline. Immediately following the deadline, however, (presuming the deadline had been met), criticality of the assets involved in meeting the deadline can decrease (at least as it concerns the deadline), among potentially many other examples.

In another example, rules used in automated asset criticality assessments can include status rules 252 that tie certain status-type characteristics of assets with higher criticality. For instance, data identifying that an asset possesses certain particular status attributes can be interpreted as evidence of higher criticality of the asset based on status rules 252. Example status attributes can include such characteristics as the operating system of the asset, geographical location of the asset (or machine hosting the asset), whether or not the asset is implemented in the cloud, how the asset connects to the computing environment, what networks its uses, the make and model of the asset, hardware employed on the asset, and other descriptive attributes of the status and nature of the asset.

Other rules can also be employed in automated criticality assessments. Indeed, in some instances, user interfaces and tools can be provided allowing users to custom-define additional rules (e.g., 254) for consideration in automated criticality assessments of assets. Indeed, in some implementations, users can be provided with user interfaces and tools (e.g., through rules engine 245) for defining and modifying parameters and logic of any of rules 246-252, such as through the user-definition of rule thresholds, weights to be assigned to certain rules and attribute values triggering a higher or lower criticality assessment relative to other rules, how satisfaction (or violation) of a rule by asset attributes affects the asset's criticality rating, and so on. In this way, administrators can prioritize, harmonize, and customize assessment rules used in automated criticality assessments to the respective organization and computing environment of the assessed assets.

An example security manager 210 can be provided and use criticality ratings and scores generated by a criticality assessment engine 205. Additionally, example security managers 210 can also support the collection of data used in the automated criticality assessments in some instances. In one example implementation, a security manager 210 can include one or more processors (e.g., 285), one or more memory elements (e.g., 286), among other components, including, in this particular example, a risk assessment engine 288, scan controller 289, agent manager 290, among other functionality and related components, such as for instance, a repository manager managing asset repository 215, among other examples.

In one example, a risk assessment engine 288 can perform risk assessments of a system and individual assets within or otherwise using the system. Risk assessments performed by the risk assessment engine 288 can attempt to identify all of the vulnerabilities and/or threats present on or facing a particular asset (e.g., 225, 230, 235) and calculate computing risk associated with these vulnerabilities and threats. A risk assessment can further identify countermeasures deployed or otherwise implemented on the system that serve to mitigate the risk posed by particular vulnerabilities and/or threats. The security manager 210 can then use the risk assessment in connection, for example, with a countermeasure deployment module 291 to initiate deployment or adoption of identified countermeasures addressing the discovered vulnerabilities and/or threats.

Data used by the security manager 210, and more particularly by a risk assessment engine 288, in this example, can be collected by a variety of different sensors deployed both remote from the assets (e.g., through certain tools of security tool deployment 220) as well as locally on the assets (e.g., through agents 296, 297, 298). Sensors can also serve as security tools in that they both monitor and collect data from or concerning the assets and protect the assets, for instance, by providing one or more countermeasures. For example, some sensors can include one or more passive countermeasures that are part of the sensor. Such passive countermeasures can include software programs and/or hardware that protect assets from various threats. Each passive countermeasure can reduce the risk that a threat will affect an asset. A passive countermeasure protects against a threat by attempting to detect and stop an attack associated with the threat, by detecting and stopping activities associated with the attack, or by mitigating damage caused by an attack. For example, a passive countermeasure may be configured to detect data having a signature associated with a particular attack, and block data with that signature. As another example, a passive countermeasure may generate back-up copies of particular files targeted by an attack, so that even if the attack attacks the files, the files can be restored. Example passive countermeasures include, but are not limited to, hardware firewalls, software firewalls (e.g., 265), web filters (e.g., at 266), mail filters (e.g., at 268), host-based intrusion prevention systems (e.g., 270), network-based intrusion prevention systems (e.g., 272), rate-based intrusion prevention systems, content-based intrusion prevention systems, intrusion detection systems (e.g., 274), policy and compliance detection and management programs (e.g., 275), virus and malware detection software (e.g., 276), data loss prevention systems (e.g., 278), web proxies, among other examples. Passive countermeasures can also be partial countermeasures that do not completely protect assets from or mitigate the effects of an attack. For example, a partial passive countermeasure might block some, but not all, of the network traffic associated with a particular attack. As another example, if a threat needs either direct physical access or network access to compromise an asset, an example partial passive countermeasure would block network access to the asset, but not physical access.

The assets (e.g., 225, 230, 235) can also be protected by one or more active countermeasures that are applied to the asset. Active countermeasures can make changes to the configuration of assets or the configuration of existing passive countermeasures to actively eliminate a vulnerability. In contrast, passive countermeasures hide the effects of a vulnerability, but do not remove the vulnerability. Each active countermeasure eliminates, or at least reduces, the risk that a threat will affect an asset when the active countermeasure is applied to the asset by eliminating, or at least reducing, a vulnerability. For example, an active countermeasure can close a back door that was open on an asset or correct another type of system vulnerability. Example active countermeasures include, but are not limited to, software patches that are applied to assets.

Countermeasures can be provided by agents (e.g., 296, 298, 298) and/or network-based utilities, including security tools and network elements in communication with assets of the computing environment. When a countermeasure is provided by an agent-based sensor running on the asset, it can be determined that the countermeasure is protecting the asset. However, network-based countermeasures are remote from the assets they are protecting. Therefore, additional data may associate network-based passive countermeasures with the assets they protect. Countermeasure detection engine 293 can determine and maintain records of which assets are monitored by which sensors, and then associate, for each sensor, the countermeasures provided by the sensor with each of the assets monitored by the sensor. Countermeasure detection engine 293, in some instances, can automatically detect associations between countermeasures and the assets they protect. For instance, countermeasure detection engine 293 can automatically correlate sensors with assets based on alerts received from the sensors.

Agent-based sensors (e.g., 296, 297, 298) can include software-based sensors that are installed on respective assets (e.g., 225, 230, 235). In some examples, instances of an agent-based sensor can be installed or otherwise loaded independently on each or in connection with a plurality of system assets (e.g., 225, 230, 235). An agent-based sensor can be adapted to run various analyses on their respective assets, for example, to identify attributes of the asset(s) (e.g., for consideration in automated criticality assessments), identify vulnerabilities on the assets, or to identify viruses or other malware executing on the assets, among other examples. Such agent-based sensors can include general- or multi-purpose sensors adapted to identify multiple different types of vulnerabilities or threats on an asset, as well as specialized sensors adapted to identify particular attributes, vulnerabilities and threats on an asset. For instance, agent-based sensors can identify such related attributes as the operating system of a host, applications and other programs on a host, content hosted by the asset, peripherals used at the device, user profiles and history on the host device, passwords, encryption protocols, and other attributes of the host devices, their respective applications, data, and users, and so on. Agent-based sensors can also identify security tools, protections, and other security-related attributes of the assets such as, for example, data loss prevention initiatives or programs protecting the asset, access and change control functions and lists, whitelists, blacklists, and graylists used by and/or entrusted with the asset or asset host, among other examples. Agent-based sensors may also provide one or more passive countermeasures for threats, similar to those described elsewhere above. As but one example, an agent-based sensor can include antivirus software loaded on an asset. Further, agents can be used as a local interface and tool for deploying countermeasures on its host asset (e.g., 225, 230, 235).

Network-based sensors can include hardware devices and/or software in a data communication path (e.g., in network 150) between system assets monitored and/or protected by the sensor and the network resources that the asset is attempting to access. In some implementations, a single network-based sensor can be in a communication path with a plurality of assets, while in other configurations multiple network-based sensors can be connected to the same asset, and some assets may not be connected to any network-based sensors. When an asset (e.g., (e.g., 225, 230, 235) tries to send information through the network 150 or receive information over the network 150, for instance, through a network-based sensor, the sensor analyzes information about the asset.

In some implementations, a security manager 210 can include tools for managing security tools (e.g., 265, 266, 268, 270, 272, 274, 275, 276, 278) as well as the data collecting functionality of these tools, for instance using a scan controller 289. Similarly, an example security manager 210 can include an agent manager 290 for communicating with, controlling, interfacing with, and otherwise managing agents (e.g., 296, 297, 298) deployed on certain assets (e.g., 225, 230, 235) of the computing environment.

Security manager 210 can, in some implementations, further manage the building of an asset repository 215 or other data stores aggregating and storing data collected from the variety of sensors, scanners, network elements, agents, and security tools deployed in the computing environment. An asset repository 215 can collect a variety of records, such as assessment records 256 including data from and descriptions of previous risk assessments, risk scoring, scans, etc. of various assets of the computing environment. A security manager 210 can generate the assessment records 256 based on assessments it conducts and store records 256 of the assessments in the asset repository 215. The security manager 210 can itself use records of the asset repository 215 in its assessments, including asset records that include, for each asset, data describing attributes of the asset, based for instance, on data collected by the sensors, agents, and security tools of the computing environment. Other records used by the security manger 210 can include threat records 260 describing known threats and vulnerabilities exploited by the respective threat, vulnerability records 262 describing known vulnerabilities and asset attributes evidencing presence of the vulnerability, and countermeasure records 264 describing known countermeasures, the asset attributes indicating whether the countermeasure has been deployed or is compatible with a given asset, and an indication of the vulnerabilities and/or threats remedied by the countermeasure, etc. Further, criticality records 255, generated for instance using criticality assessment engine 205, can also be utilized, by the security manager, for instance in the assessment of risk attributable to a corresponding asset, deployment of countermeasures on an asset, and various other assessments and analyses.

An example risk assessment engine 288 can be used to generate risk scores and perform other security-related assessments of assets from data collected by sensors, agents, and security tools, as well as data maintained at an asset repository 215. Assessments of the risk assessment engine 288 can include generation of one or more risk metrics. A risk metric can include a quantitative measure of the risk that a threat or vulnerability poses to an asset, both in terms of the probability that the threat or vulnerability will affect the asset and the magnitude of the potential effect (e.g., based on criticality ratings of the affected asset(s)). Risk metrics can also include counter-risk metrics quantifying the effect of countermeasures on a particular asset. Further, risk metrics can be aggregated to develop composite risk profiles or scores of the asset, groups of assets, an entire system or subsystem of assets, etc.

An example risk assessment engine 288 can include a variety of functions and features, provided, for instance, through one or more software-based modules. As an example, a risk assessment engine 288 can include a vulnerability detection engine 292, countermeasure detection engine 293, and threat detection engine 294 for use in automatically identifying vulnerabilities, deployed countermeasures, and threats affecting particular assets (e.g., 225, 230, 235) in system 100.

Using vulnerabilities (e.g., detected or identified using vulnerability detection engine 292), countermeasures (e.g., detected or identified using countermeasure detection engine 293), and threats (e.g., detected or identified using threat detection engine 294) a variety of risk-based analyses can be completed. Further, criticality metrics, scores, and ratings derived using criticality assessment engine 205 can also be provided to calculate a risk metric for an asset, for instance, using risk calculator 295. For instance, a risk calculator 295 can be used to complete a risk assessment of one or more corresponding system assets, for instance, by calculating one or more risk scores or risk profiles for the assets.

Risk assessment monitor 288 can receive (and store in one or more data stores 280) one or more of threat definition data 260, vulnerability detection data 262, asset configuration data (e.g., in asset records 258), countermeasure detection data 264, and criticality records 255. The threat definition data 260 can describe identified threats, what countermeasures (if any) protect assets from the threats and vulnerabilities, and the severity of the threat. The vulnerability detection data 262 can specify, for each asset and for each threat, whether the asset is vulnerable to the threat, not vulnerable to the threat, how the asset is vulnerable to one or more known or unknown threats, and/or of unknown vulnerability. The asset configuration data 258 can specify, for each asset (e.g., 225, 230, 235), details of the configuration of the asset. The countermeasure detection data 264 can specify, for each asset, what countermeasures are protecting the asset.

In some implementations, asset records 258 can be the product of aggregating data from a variety of different sources having data describing configurations, attributes, and characteristics of the assets (e.g., 225, 230, 235). In some instances, asset records 258 can also include criticality ratings, metrics, and scores generated for the asset by an example criticality assessment engine 205. The configuration of an asset can be a hardware and/or software configuration. Depending on the configuration, various threats may be applicable to an asset. In general, the configuration of the asset can include one or more of the physical configuration of the asset, the software running on the asset, and the configuration of the software running on the asset. Examples of configurations include particular families of operating systems (e.g., Windows™, Linux™, Apple OS™, Apple iOS™), specific versions of operating systems (e.g., Windows 71, particular network port settings (e.g., network port 8 is open), and particular software products executing on the system (e.g., a particular word processor, enterprise application or service, a particular web server, etc.). In some implementations, the configuration data does not include or directly identify countermeasures in place for the asset, or whether the asset is vulnerable to a particular threat. Further, configuration information and other information in asset records 258 can be used in automated criticality assessments using a criticality assessment engine 205.

A countermeasure deployment tool 291 of an example security manager 210 can be used to deploy countermeasures on assets of a computing environment. Detection of a particular vulnerability or threat, based on a scan of one or more assets, can serve as the basis for deployment of countermeasures using an example countermeasure deployment tool 291. In some instances, deployment of countermeasures can be prioritized, in that deployment targets more important or higher-criticality assets before lower-criticality assets, as calculated using a criticality assessment engine 205. Further, scans and assessments by a security manager 210 can themselves trigger automated criticality assessments of assets using an example criticality assessment engine 205. For instance, in a risk assessment that factors assets' respective criticalities, an automated criticality assessment can be carried out for at least a portion of the scanned assets to obtain up-to-date criticality assessments and ratings, or at least check and confirm the accuracy of other criticality scores to be used in the assessment. Similarly, automated criticality assessments can be triggered based on countermeasure deployments, so as to determine which assets should have the countermeasures deployed first, among other examples.

Figure 3:
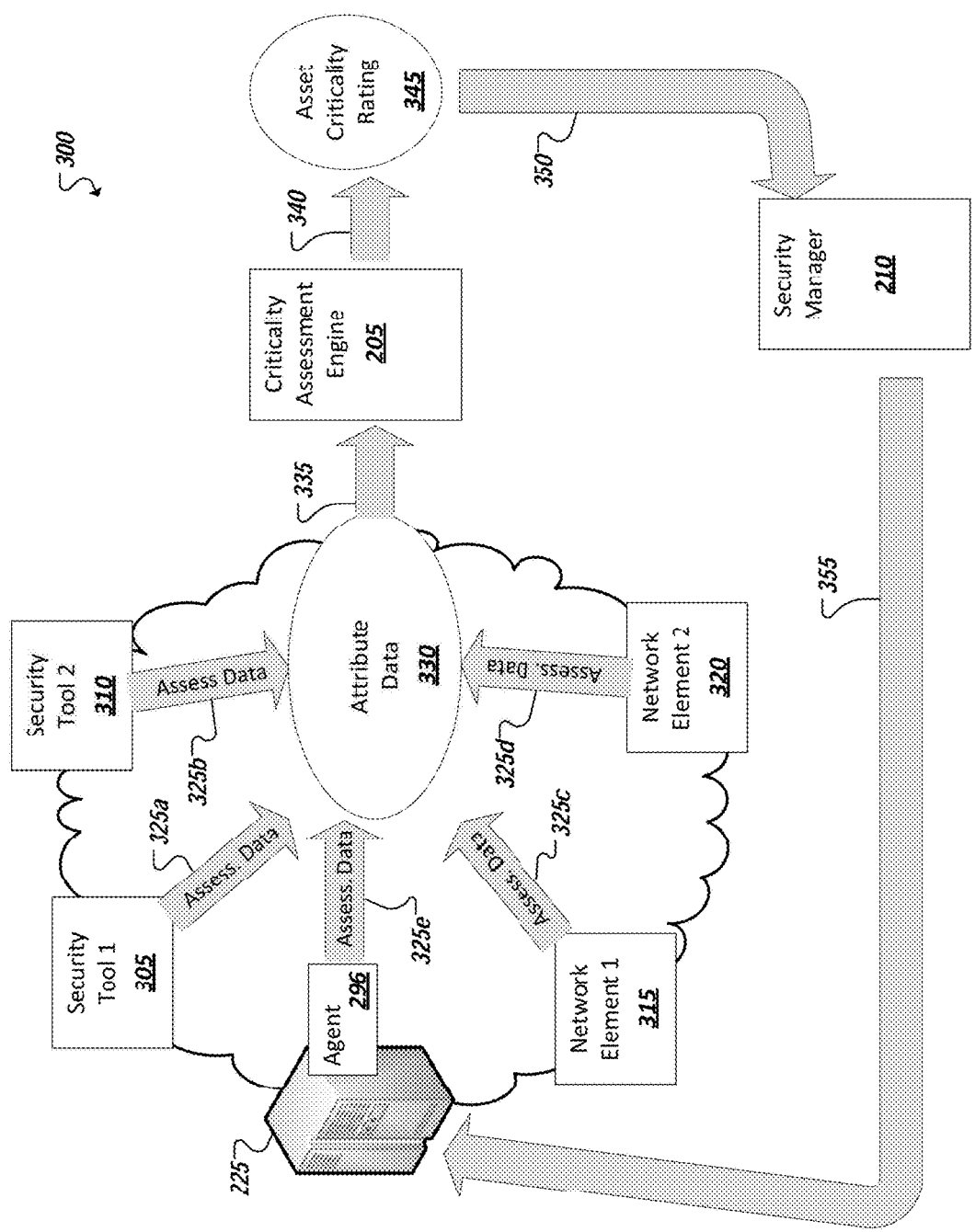
FIG. 3 is a simplified block diagram representing an example criticality assessment of an asset in a computing network in accordance with one embodiment.

Turning to FIG. 3, a simplified flow diagram 300 is shown representing an example automated criticality assessment of a particular asset (e.g., 225). In this particular example, a variety of different sensors and tools within a system can monitor and collect data relating to the asset 225. This data (e.g., 325a, 325b, 325c, 325d, 325e) can be collected without the intervention of users. The collected data (e.g., 325a, 325b, 325c, 325d, 325e) can each represent a portion of attribute data 330 describing attributes of the particular asset 225. In some instances, the collected data (e.g., 325a, 325b, 325c, 325d, 325e) can be aggregated, stored in a asset record (e.g., of an asset repository database) or otherwise communicated, pushed, accessed, or otherwise made available 335 to an asset criticality engine 205 for use in assessing the asset's 225 attributes against criteria, rules, and other logic defining how, whether, and to what degree attributes evidence higher or lower criticality of the asset 225. The results of the assessment can be used to generate 340 an asset criticality rating 345 that can be communicated 350 to other entities in a computing environment, such as a security manager 210, for use in other assessments, analyses, security management, and other activities using asset criticality information. In some implementations, a security manager 210 can utilize the criticality information in connection with the deployment of a countermeasure on the asset 225, among other examples.

Attribute data can be derived and/or collected from a variety of sources. For instance, security tools (e.g., 305, 310), including security tools deployed local to and remote from the asset 225 itself, can conduct scans, perform security checks, monitor network traffic, serve as a communication gateway, and otherwise identify and collect asset information through a variety of security-related activities. Security data (e.g., 325a, 325b) can include asset information describing attributes of the asset 225 and can be communicated 335 to criticality assessment engine 205. Further, network elements (e.g., 315, 320), such as routers, gateways, DNS servers, span ports, network data stores (e.g., MAC tables, DHCP tables, etc.), and other elements can also collect or maintain information relating to attributes of the asset 225, particularly relating to or captured from communications over one or more networks relating to the asset 225. Network data (e.g., 325c, 325d) can be queried by, communicated to, or collected for access (e.g., at an asset repository) by a criticality assessment engine 205. Further, sensors can be network-based, such as some network elements and some security tools, while agent-based sensors (e.g., on agent 296) operating local to the asset 225 can also provide attribute information (e.g., 325e) included in attribute data 330.

Criticality ratings (e.g., 345) can be based on attribute information and data from one or more sources (e.g., 296, 305, 310, 315, 320). In some implementations, a criticality assessment engine 205 can generate a criticality rating for each reported attribute of an asset 325. In other instances, groupings or multiple pieces of attribute information 325a-e can be considered together in the generation 340 of a single asset criticality rating, among other examples. For instance, categories of attribute information can be identified and considered together in the generation of category-specific criticality ratings (or sub-scores), such as categories corresponding to attribute information from network-based sources (e.g., 305, 310, 315, 320), attribute information from local- or agent-based sources (e.g., 296), attribute information from traffic-related information, among many other potential example categories. In such implementations category-specific criticality ratings can assist administrators, for example, in identifying what categories of attributes generally make the asset 225 more or less critical, compared to other categories of asset attributes. The criticality ratings can then be combined or aggregated to calculate composite or overall criticality ratings, based on the combined knowledge gleaned in the set of attribute data 330 from the plurality of sources. Indeed, criticality ratings (e.g., 345) can be generated from a variety of different combinations of different assessment data, network data, user data, network-based sources, local sources, and so on.

Figure 4:
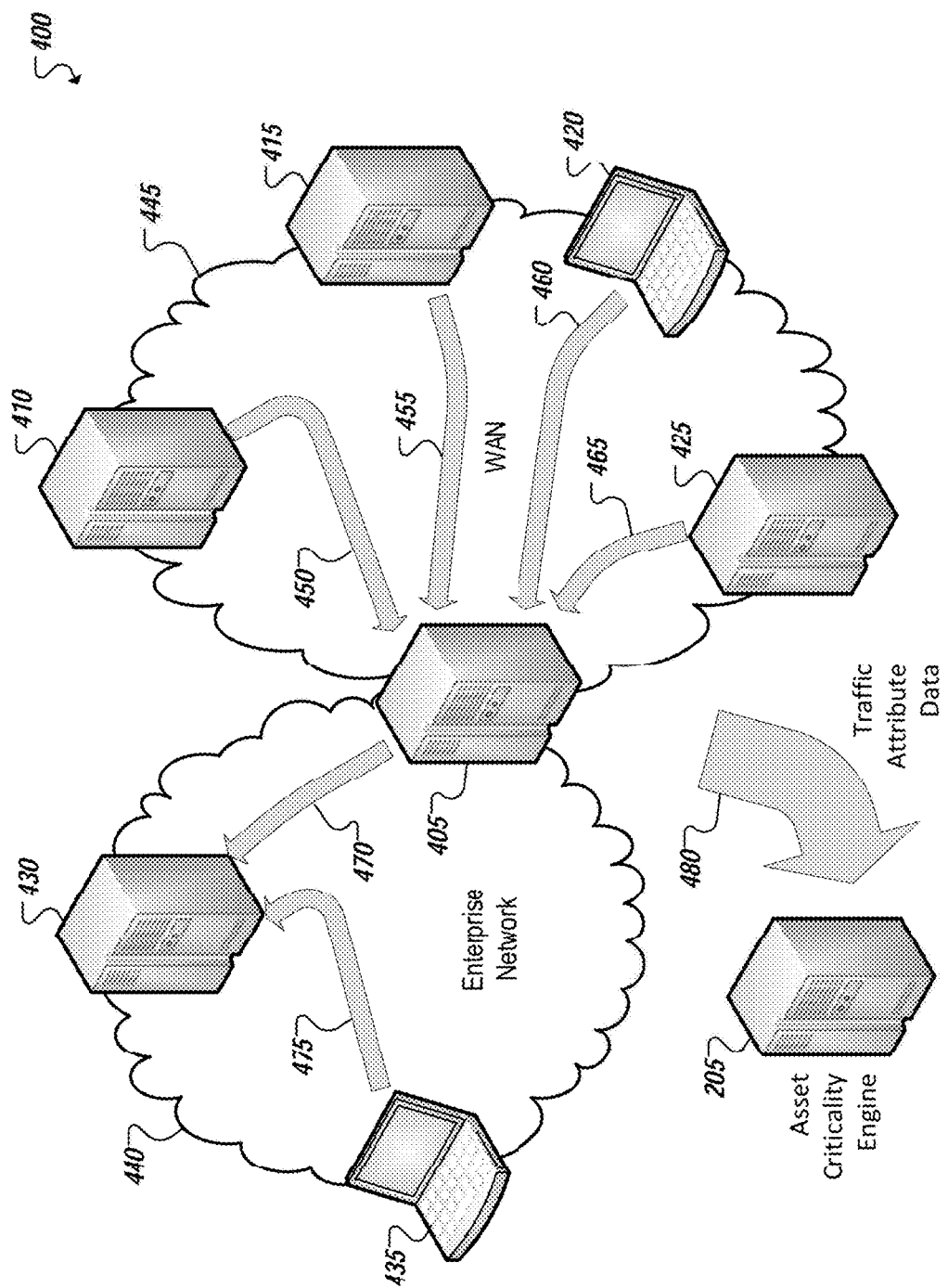
FIG. 4 is a simplified flow diagram illustrating example criticality assessments in a computing environment in accordance with one embodiment.

Turning to FIG. 4, a simplified flow chart 400 is shown illustrating the collection of attribute data relating to traffic-related attributes of one or more assets (e.g., 405, 430, 435) in a particular network 440 of a computing environment. Monitoring trends in network traffic across one or more networks (e.g., 440, 445) can highlight importance and dependence of other assets on a particular asset within one or more computing environments, thereby evidencing the criticality of the particular asset. In one example, a front-end server 405 of a computing system can be used to host websites, online storefronts, web applications, and other data, content, and services, among other examples, that can be accessed and consumed by other devices (e.g., 410, 415, 420, 425, etc.). Communications (e.g., 450, 455, 460, 465) can be monitored, intercepted, detected, reported, or otherwise identified by various network elements and tools deployed, for instance, in network 440 and monitoring traffic originating from or involving entities inside and/or outside a monitored network (e.g., 440), such as a web gateway, email gateway, router, or other network element. Traffic data can be extracted or generated based on the identified communications 450, 455, 460, 465 to identify system assets' 405 involvement in each of the communications 450, 455, 460, 465 as well as the nature of each asset's 405 involvement. For instance, it can be identified that the communications originated from or otherwise involved other devices, such as remote client devices (e.g., 410, 415, 420, 425), over a wide area network 445, such as the Internet. In addition to identifying the parties involved in the communication, (e.g., 450, 455, 460, 465) traffic information gleaned from the communications 450, 455, 460, 465 can also include the type of data communicated, such as whether the data was encrypted, the types of files communicated, the types of requests involved in the communication (e.g., PHP requests evidencing database queries, etc.), the protocol(s) used in the communication, content in payload of the communications, among other examples.

The amount and type of traffic involving an asset can correspond with the asset's criticality. For instance, a particular system device (e.g., 225) can handle a relatively large number of requests (e.g., 450, 455, 460, 465) from other devices relating to services provided by a particular computing network 440, or be responsible for originating requests or other communications to other devices. In one illustrative example, if a core business of an entity involves the hosting of services or content to remote clients (e.g., 410, 415, 420, 425) over the Internet or other wide area network (e.g., 445), rules can be defined that correlate high traffic (e.g., HTTP, HTTPS, PHP, XML, or other traffic) involving a particular asset with the asset's importance with the delivery of the services and/or content hosted by the entity. For instance, a particular server (e.g., 225), or databases, applications, files, or other assets hosted by the server 225, can be subject to frequent access or requests in connection with identified communications 450, 455, 460, 465, evidencing the respective asset(s) criticality within the environment. In addition to the type and frequency of communications, the clustering and other trends of the communications can be identified from the captured communications 450, 455, 460, 465, such as time-clustering, geographical clustering (e.g., communications that originate from a common country, etc.), and other examples and this information can also serve as criteria used in automated criticality assessments based on monitored traffic.

In addition to traffic across networks 440, 445, traffic within a network (e.g., 440) between assets, can be monitored and used as the basis of criticality assessments. Indeed, many of the same principles and information can be used in intranetwork traffic monitoring. For instance, in the example of FIG. 4, a pattern of traffic (e.g., 470) from server 405 to server 430 can be identified. For instance, server 405 may utilize backend server 430 to generate responses, dynamic content, etc. responsive to requests from client devices 410, 415, 420, 425. Indeed, in some implementations, based on traffic patterns and types of data identified in communications (e.g., 450, 455, 460, 465, 470, etc.), the role of a particular asset can be identified. For instance, from the monitored traffic, server 405 can be identified as a server interfacing with clients and hosting public services and content, etc., while backend server 430 is identified, for instance, as a database management server and database host (e.g., based on PHP queries from server 405) used in the provision of services and content to customers, among other examples. Asset roles and profiles, such as a database host role, host of private or proprietary data role, device providing critical network or communication support role, etc. can be defined from monitored traffic and other attribute data. Assets can thereby be categorized by role or profile, with assets of certain identified roles, functions, or profiles earning higher or lower criticality ratings relative other assets based on the identified roles, etc.

Additionally, traffic from user device assets (e.g., 435) can be associated with particular users within a computing environment. Based on the identity of the user, communications involving the user's device can also be used to identify an asset's importance. For example, if a high-level administrator, executive, etc. (at device 435) is participating in communications 475 requesting frequent use of a particular asset 430 (or assets hosted by asset 430), the volume of communications from the particular user can be defined to correspond with the asset's 430 criticality, among other examples. Additionally, the type of transactions and traffic involving the identified user can also be considered. In some instance, consumption of an asset or resource (e.g., a read transaction) can be assessed differently that a transaction that indicates that the user has some control in the creation and/or management of the asset. In some implementations, mere consumption of an asset by a user can imply lesser importance relative to creation or modification of the asset by a user, while in other cases consumption can itself indicate the asset's particular importance and criticality (e.g., when the asset is relied upon to provide a critical input to a business process, etc.). Regardless of the various possible rules and criteria defined for use in automated criticality assessments, traffic attribute data 480 can be collected describing a variety of different communications and transactions and the data 480 can be mined in connection with automated criticality assessments by an example asset criticality engine 205.

Figure 5:
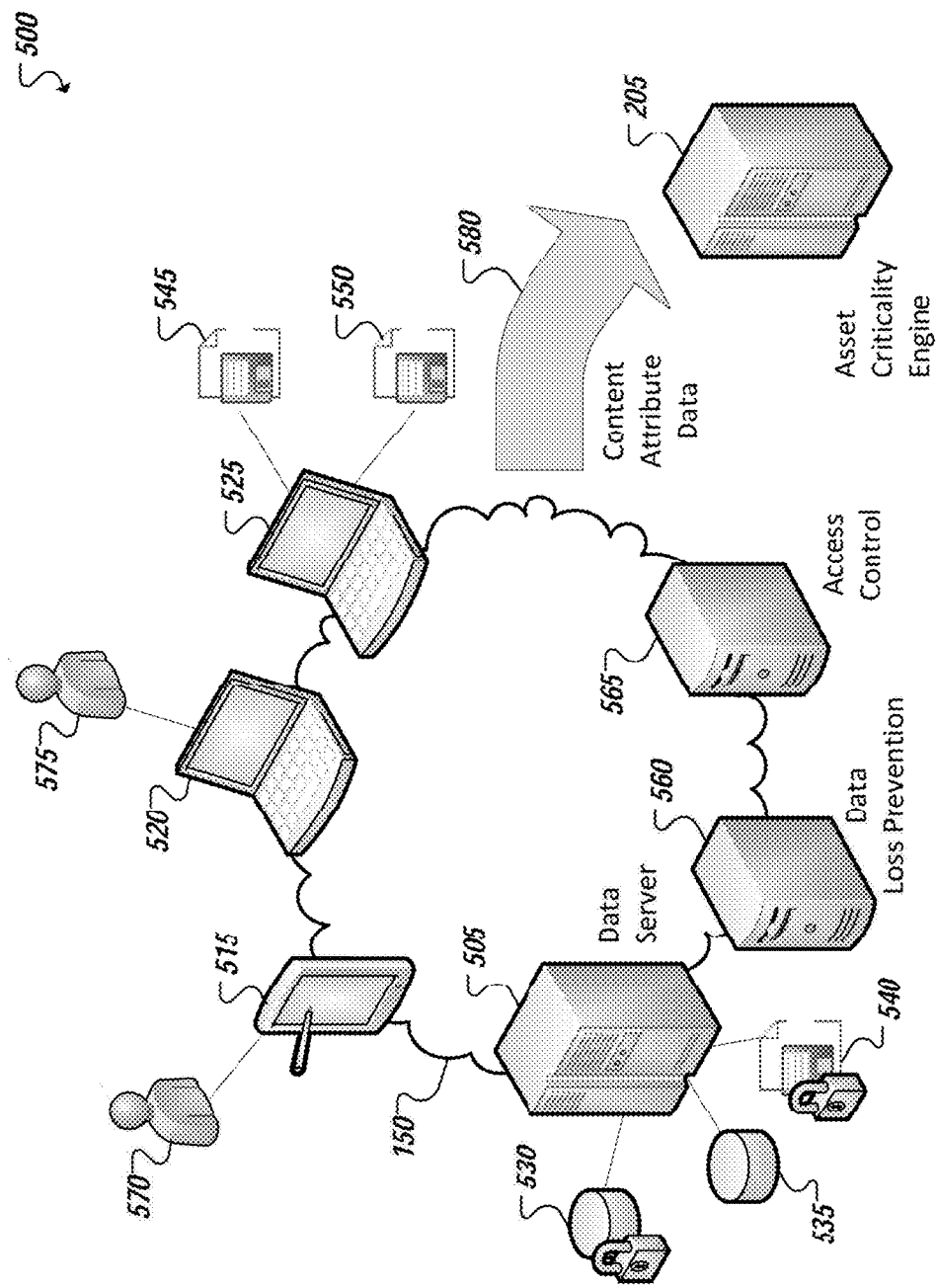
FIG. 5 is a simplified flow diagram illustrating further example criticality assessments in a computing environment in accordance with one embodiment.

Turning to FIG. 5, content-based rules and criteria can also be generated in connection with automated criticality assessments. In the example of FIG. 5, a simplified block diagram 500 is shown of a portion of a computing environment including various assets, including system assets (e.g., 505, 510, 515, 520, 525, etc.), data and application assets (e.g., 530, 535, 540, 545, 550), among potentially many others. Asset-based agents, local and remote security tools (e.g., 560, 565), and other system utilities can identify and collect information, embodied in content attribute data 580, describing content-related attributes (as well as potentially other attributes, such as user-related attributes) for use in automated criticality assessments by an example asset criticality engine 205. For instance, attributes such as the applications, programs, patches, etc. stored on a device (e.g., 505, 515, 520, 525, etc.), content of data in files and data structures of the devices, etc. can be identified using system utilities and sensors.

In one example, the security policies, tools, and protocols already employed in connection with an asset can be described in content attribute data 580 detected by system sensors and used in automated criticality assessments. For instance, rules and criteria can be established for use in the criticality assessment that credit the detection of already-deployed security measures as evidence of the respective asset's criticality within the environment. For instance, detecting that certain assets are monitored, locked, encrypted, or otherwise secured or protected, such as a protected database 530, protected file 540 (e.g., a content or application file, etc.), etc., can raise criticality ratings of the protected assets (e.g., 530, 540). Further, other assets that host protected assets, allow access to protected assets (e.g., through associated with certain authenticated users (e.g., 570)), or are otherwise associated with the data or application assets (e.g., 530, 540) can also be assessed with higher criticalities based on their affiliation with protected assets.

In the particular illustrative example of FIG. 5, a server 505 can host content including database 530, database 535, and file 540. Some content and application assets (e.g., 530, 540) hosted by the data server can be protected, for instance, through access control protections (e.g., access control lists, whitelists, blacklists, user authentication, encryption, etc.), data loss prevention protocols and policies (e.g., version control, change control, limited and controlled read, write, copy access, etc., and so on), among other protections and policies. Tools within the computing environment (e.g., data loss prevention tools 560, access control tools 565, among others), including agents on server 505 or tools deployed at least partially remote from server 505, can maintain data describing policies, access rules, access control lists, and other data indicating that certain data and applications hosted by server 505 are protected as well as how and why they are protected, among other examples. Such information can be mined from the security tools (e.g., 560, 565) and provided as content attribute data 580 for an asset criticality engine 205. Further, based on information indicating that assets (e.g., 530, 540) hosted by the server 505 are protected and apparently of value or importance, the criticality of server 505, hosting the assets 530, 540, can also be assessed higher (e.g., relative to other assets (e.g., 525, 535, 545, 550, etc.) without such protections).

In addition to identifying protected critical assets and other assets hosting the assets and basing criticality assessments on such information, criticality assessments can further use information describing attributes of protected content and applications to identify other assets otherwise affiliated or associated with the protected assets. For instance, data loss prevention and access control protections can limit access and use of certain assets to certain users, user roles and groups, etc. Further, certain types of system assets can also be limited in their ability to access and consume the protected assets based on protections in place. For instance, an access control list can limit access (e.g., of database 530, application 540, all content on a particular server (e.g., 505), etc.) to certain privileged users (e.g., 570). Consequently, system assets associated with the privileged users can be assumed to belong to important or trusted users within an organization, among other examples, causing the associated user devices (e.g., 515) to be assessed with higher criticality than other devices (e.g., 520) with users (e.g., 575) who have not earned or otherwise been granted access to (and potentially also have sensitive content and related information) the protected assets (e.g., 505, 530, 540, etc.).

As a simplified example, a whitelist (or alternatively a blacklist or graylist) can be deployed on an example server 505 and indicate that only certain other system devices (e.g., 515) are allowed to access the server 505 or certain assets hosted or protected by the server 505. The presence of the whitelist can be used, first, as evidence that the server 505 hosts important information and assets deserving such protection, as well as, second, indicating attributes of those client systems identified in the whitelist that can be considered in criticality assessments of the client systems, among other examples.

In addition to identifying security protections in place in connection with an asset (e.g., 505, 530, 540), other rules and criteria can be defined and weighted for consideration in automated criticality assessments relating to the content, subject matter, and/or quantity of data maintained on a system asset, data structure asset, etc. For instance, server assets (e.g., 505) hosting relatively large amount of data or other assets can have higher criticalities than other system assets. Similarly, data structures, such as databases with larger amounts of data or records, can have higher criticality assessments. Further, the content of data or type of applications can also be identified, with rules and criteria in place for assessing criticality based on the type of data or application. For instance, data structures can be identified as maintaining trade secrets, credit card and other private customer data, or other such private and sensitive types of data, resulting in higher criticality assessments of the data structures (and servers hosting the data structures), among other content-related attributes and considerations.

Criticality ratings, scores, and other metrics can be accessible to a variety of different tools within a computing environment and can be used in connection with a variety of analyses, assessments, and tasks of the computing environment. Among the variety of potential uses and implementations, automated asset criticality assessments can be performed, in some instances, in response to a detected security condition, a countermeasure deployment, or other event, in some cases allowing a substantially real time assessment of one or more assets to reflect conditions of the assets at the time of the event.

As an illustrative example, a web browser can be attempted to be launched with administrative privileges on a particular asset with an advanced database server license and 10 terabytes of data. An automated criticality assessment of the particular asset can be performed in response to the attempt and result in the determination (or confirmation) of high criticality of the particular asset. Further, it can be identified that the particular web browser to be launched possesses ten critical vulnerabilities. Based on the results of the automated criticality assessment of the particular asset however, attempting to launch the particular web browser with administrative privileges can be denied due to the seriousness of the vulnerabilities and the asset's high criticality. In another example, the same web browser can be attempted to be launched and allowed to be launched with non-administrative privileges on the particular asset, given the lesser risk associated with the web browser when launched without administrative privileges. Similarly, launching the particular web browser may be further allowed, with administrative privileges, on another asset that has a lower criticality (e.g., as determined through an automated criticality assessment of this other asset), as but three of potentially limitless other examples.

Automated criticality assessments can be performed through a collection of check scripts corresponding to various rules, criteria, or logic defined for a particular computing environment. Each check can analyze whether particular attributes or conditions exist on an asset that evidence higher or lower criticality of the asset. The results of each check can then be processed to determine one or more criticality ratings or scores. Further, users or administrators can define weights or other parameters of each check. For instance, check results with higher weights can contribute more predominantly to the generated criticality rating than check results with lower weights. Defining the weighting of each check can allow administrators to tailor the check to their respective environment. Further, attribute values of the checks can be specified or customized by users according to their environments. For instance, an example database check can generate check results based on the number of records stored in a database. Accordingly, in this particular example, an administrator can define one or more attribute threshold values for the number of records in a database, and further define what and how check results will be generated based on how an individual database asset's own attributes correspond to the defined threshold values, among many other examples. Indeed, in some implementations, checks can be reusable within multiple different computing environments, with parameters, configurations, and weights of each check defined specific to the respective environment to reflect the priorities and characteristics of the respective environment and generate criticality ratings reflective of these priorities and its computing environment.

It should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Figure 6:
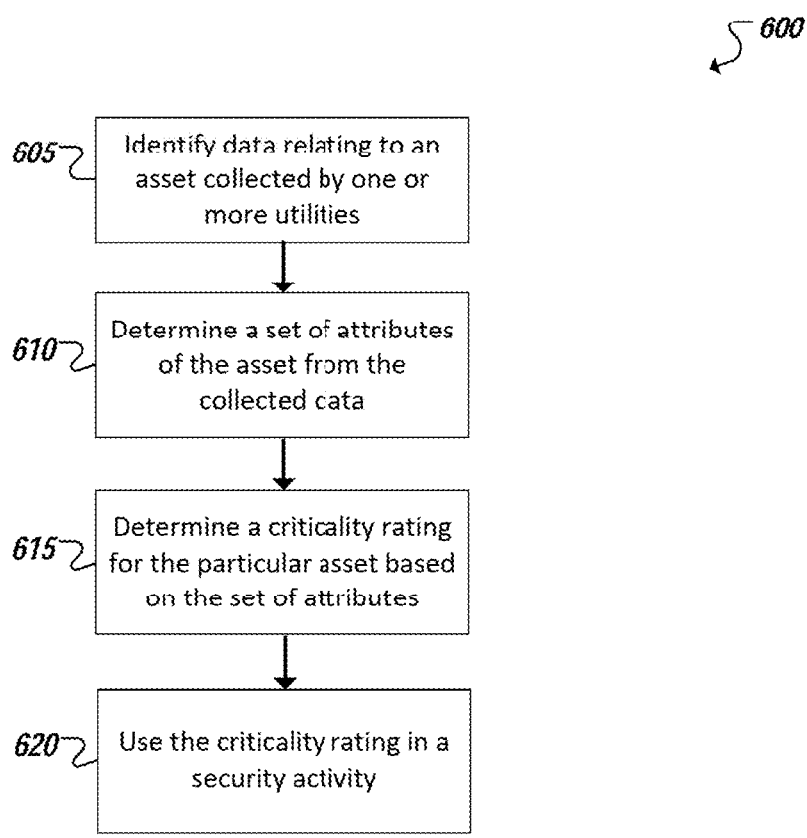
FIG. 6 is a simplified flowchart illustrating example operations associated with at least some embodiments of the system.

FIG. 6 is a simplified flowchart 600 illustrating example techniques for determining a criticality rating for a particular asset in a computing environment. Data can be identified 605 that has been collected by one or more utilities within the computing environment, the utilities including utilities local to the asset (or a computer hosting the asset), such as an agent, as well as utilities remote from the asset, such as network elements, security tools, and other utilities capable of collecting information within the computing environment. A set of attributes of the asset can be determined 610 from the collected data. Such attributes can include the location of the asset, owners/users of the asset, network traffic patterns associated with the use of or communication with the asset, content of data stored or used by the asset, security protections and policies relating to the asset, the role of the asset within the computing environment, protocols used by the asset, among other examples. A criticality rating can be automatically determined 615 for the asset based on the set of attributes. For instance, determining the criticality rating can include determining whether the set of attributes correspond with a set of characteristics defined as evidencing higher or lower criticality of assets within the computing environment. The set of characteristics can be embodied in rules, criteria, logic, etc. In some implementations, a set of checks can be used to determine 615 criticality ratings for assets in the computing environment, each check adapted to determine whether attributes of an asset correspond with one or more of the set of characteristics evidencing higher or lower asset criticality. Particular subsets of a library of checks can be identified as pertaining to or relevant to a particular asset or asset type as well, in some examples.

Criticality ratings determined 615 for an asset can be used 620 in connection with the performance of a security activity. Asset criticality ratings can be incorporated, for instance, in risk assessments of the asset which can, in turn, serve as the basis for countermeasures and scans launched in connection with risk management of the asset. In other instances, criticality of an asset can be considered to prioritize management, scans, countermeasure deployment, and other activities within a computing environment, with higher criticality assets receiving attention before lower criticality assets, among other examples. Criticality ratings can also be forwarded or otherwise made accessible to other utilities within a computing environment that can make use of criticality information of one or more assets within the environment, among other examples.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal per se, a computer storage medium can be a source or destination of computer program instructions encoded in an artificially generated propagated signal. The computer storage medium can also be, or be included in, one or more separate physical components or media (e.g., multiple CDs, disks, or other storage devices), including a distributed software environment or cloud computing environment.

In general, one aspect of the subject matter described in this specification can be embodied in methods and executed instructions that include or cause the actions of identifying a set of attributes of a particular asset of a computing environment determined from data collected by one or more utilities in the computing environment. A criticality rating can be automatically and dynamically determined for the particular asset based at least in part on the set of attributes. A security activity can be caused to be performed relating to the particular asset based on the automatically determined criticality rating of the particular asset.

Another general aspect of the subject matter described in this specification can be embodied in systems that include a processor device, memory element, and a criticality assessment engine. The criticality assessment engine can be configured to identify data collected by one or more utilities in a computing environment, the collected data pertaining to a particular asset of the computing environment. Further, the criticality assessment engine can identify a set of attributes of the particular asset, automatically determine a criticality rating for the particular asset based at least in part on the set of attributes, and cause a security activity to be performed relating to the particular asset based on the automatically determined criticality rating of the particular asset.

These and other embodiments can each optionally include one or more of the following features. The security activity can include a risk assessment using the automatically determined criticality rating as an input. Causing the security activity to be performed can include determining a priority for the security activity based on the automatically determined criticality rating. The criticality rating can be determined in response to an event involving the particular asset. Automatically determining the criticality rating can include determining whether the set of attributes correspond to a set of pre-defined characteristics evidencing criticality of the particular asset. Automatically determining the criticality rating can include executing a set of checks on the particular asset, each check in the set of checks used to determine whether assets include attributes corresponding to one or more particular characteristics in the set of characteristics. The identified data can be collected using an agent deployed on a computing device of the particular asset. The particular asset can include one of a data structure and an application hosted on the computing device. The particular asset can include the computing device. The set of attributes can include an attribute identifying one or more users associated with the particular asset and the automatic determination of the criticality rating can be based at least in part on the association of the user with the particular asset. The set of attributes can include a context of use of the asset by the one or more users and the criticality rating is further based at least in part on the context. The identified data can be collected using utilities remote from the particular asset. The utilities can include at least one of security tools of the computing environment and network elements of the computing environment. The identified data can be collected from both the remote utilities and a local agent deployed on a computing device of the particular asset.

Further, these and other embodiments can also each optionally include one or more of the following features. The identified data can include network data indicating monitored communications over a network relating to the particular asset. The set of attributes can include an amount of traffic over the network relating to the particular asset. The set of attributes can include identification of a computing environment user originating one or more of the monitored communications. The set of attributes can include a role of the particular asset determined from the monitored communications. The set of attributes can include a type of content included in the monitored communications. The set of attributes can include a status of the particular asset relating to how the particular asset is deployed within the computing environment. The set of attributes can include identification of a particular computing environment user associated with the particular asset. The set of attributes can include security protections deployed in connection with the particular asset. The security protections can include at least one of data loss prevention, change control policies, and access control. The set of attributes can include a type of content stored in connection with the particular asset. The set of attributes can include a type of application associated with the particular asset. The utilities can include at least one agent deployed on a computing device of the asset and at least one utility deployed remote from the computing device. A set of checks can be provided, each check adapted to determine whether assets include attributes corresponding to one or more particular characteristics identified as evidencing criticality. A repository can be provided that includes records for each of a plurality of assets in the computing environment, each record describing attributes of a respective asset, which the criticality assessment engine can use in the automatic determination of criticality ratings for the assets.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. A method, comprising:
    identifying a set of attributes of an asset of a computing environment, wherein the set of attributes identifies one or more users and a context of use of the asset by the one or more users;
    determining, using at least one processor device, a criticality rating value for the asset based at least in part on the one or more users and the context of use, wherein the criticality rating value indicates an impact of damage to or loss of the asset, and the criticality rating value is determined in response to a countermeasure deployment involving the asset or an attempt to launch the asset or an application hosted by or interacting with the asset;
    calculating a risk measure for the asset from the criticality rating value, vulnerability detection data identifying vulnerabilities of the asset, and countermeasure detection data identifying countermeasures deployed on the asset; and
    causing a security activity to be performed based at least in part on the risk measure for the asset.

2. The method of claim 1, wherein the set of attributes are determined from data collected using an agent deployed on a computing device of the asset.

3. The method of claim 1, wherein the security activity includes a risk assessment using the criticality rating value as an input.

4. The method of claim 1, wherein the causing the security activity to be performed includes determining a priority for the security activity based on the criticality rating value.

5. The method of claim 1, wherein the criticality rating value is based on a detection that the asset is monitored, locked, encrypted, secured, or is protected.

6. The method of claim 1, wherein the criticality rating value is based on a whitelist used by, entrusted with, deployed on, or identifying the asset or a host thereof.

7. The method of claim 1, further comprising:
determining that the criticality rating value does not exist for the asset based on an event involving the asset, wherein the set of attributes is determined from data collected by one or more utilities in the computing environment.

8. At least one non-transitory storage medium having instructions stored thereon, wherein the instructions, when executed on a machine, cause the machine to perform a method comprising:
identifying a set of attributes of an asset of a computing environment, wherein the set of attributes identifies one or more users and a context of use of the asset by the one or more users;
determining, using at least one processor device, a criticality rating value for the asset based at least in part on the one or more users and the context of use, wherein the criticality rating value indicates an impact of damage to or loss of the asset, and the criticality rating value is determined in response to a countermeasure deployment involving the asset or an attempt to launch the asset or an application hosted by or interacting with the asset;
calculating a risk measure for the asset from the criticality rating value, vulnerability detection data identifying vulnerabilities of the asset, and countermeasure detection data identifying countermeasures deployed on the asset; and
causing a security activity to be performed based at least in part on the risk measure for the asset.

9. The medium of claim 8, wherein the set of attributes are determined from data collected using an agent deployed on a computing device of the asset.

10. The medium of claim 8, wherein the security activity includes a risk assessment using the criticality rating value as an input.

11. The medium of claim 8, wherein the causing the security activity to be performed includes determining a priority for the security activity based on the criticality rating value.

12. The medium of claim 8, wherein the criticality rating value is based on a detection that the asset is monitored, locked, encrypted, secured, or is protected.

13. The medium of claim 8, wherein the criticality rating value is based on a whitelist used by, entrusted with, deployed on, or identifying the asset or a host thereof.

14. The medium of claim 8, the method further comprising:
determining that the criticality rating value does not exist for the asset based on an event involving the asset, wherein the set of attributes is determined from data collected by one or more utilities in the computing environment.

15. A system, comprising:
at least one memory element that stores instructions; and
at least one processor device that executes the instructions to
identify a set of attributes of an asset of a computing environment, wherein the set of attributes identifies one or more users and a context of use of the asset by the one or more users;
determine a criticality rating value for the asset based at least in part on the one or more users and the context of use, wherein the criticality rating value indicates an impact of damage to or loss of the asset, and the criticality rating value is determined in response to a countermeasure deployment involving the asset or an attempt to launch the asset or an application hosted by or interacting with the asset;
calculate a risk measure for the asset from the criticality rating value, vulnerability detection data identifying vulnerabilities of the asset, and countermeasure detection data identifying countermeasures deployed on the asset; and
cause a security activity to be performed based at least in part on the risk measure for the asset.

16. The system of claim 15, wherein the set of attributes are determined from data collected using an agent deployed on a computing device of the asset.

17. The system of claim 15, wherein the security activity includes a risk assessment using the criticality rating value as an input.

18. The system of claim 15, wherein the causing the security activity to be performed includes determining a priority for the security activity based on the criticality rating value.

19. The system of claim 15, wherein the criticality rating value is based on a detection that the asset is monitored, locked, encrypted, secured, or is protected.

20. The system of claim 15, wherein the at least one processor device executes the instructions to determine that the criticality rating value does not exist for the asset based on an event involving the asset, and the set of attributes is determined from data collected by one or more utilities in the computing environment.

* * * * *